June 27, 1961 B. S. GRACZYK ET AL 2,990,530
WINDSHIELD CLEANER CONTROL
Filed July 5, 1956 3 Sheets-Sheet 1
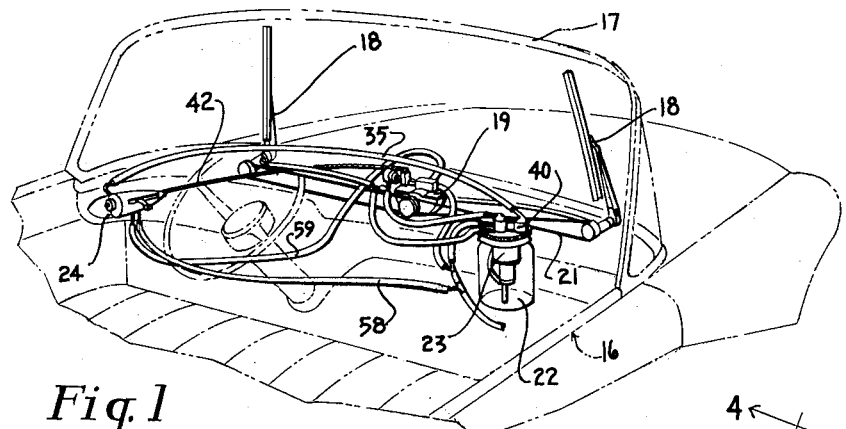
Fig. 1
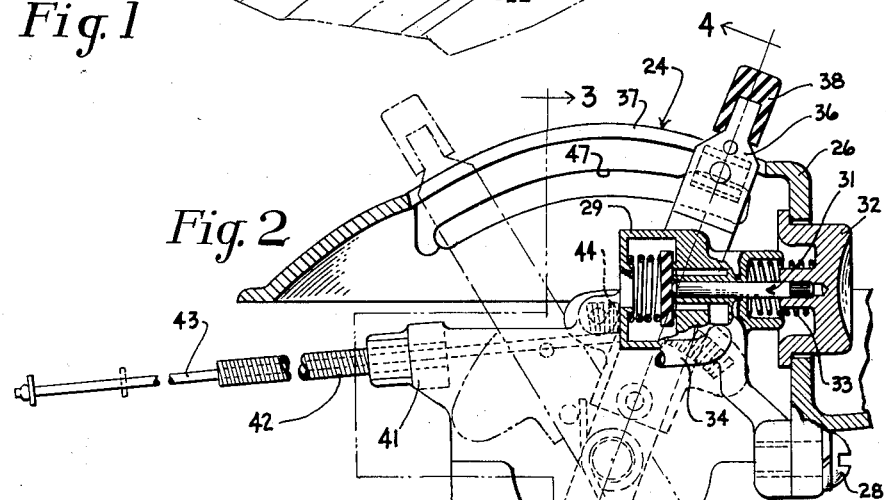
Fig. 2
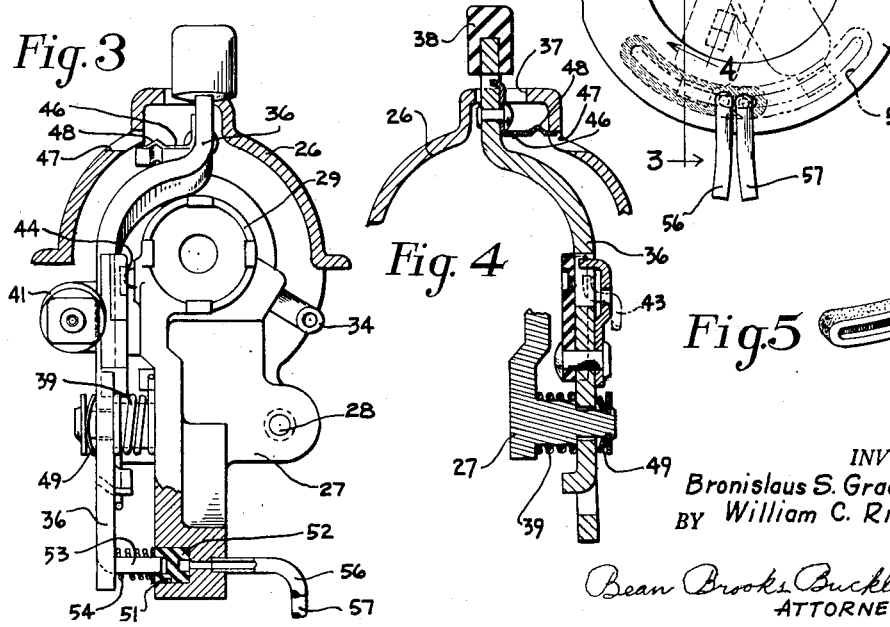
Fig. 3
Fig. 4
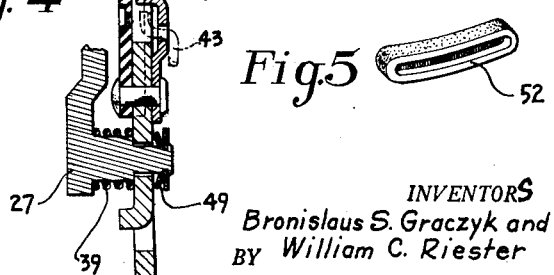
Fig. 5
INVENTORS
Bronislaus S. Graczyk and
BY William C. Riester
Bean Brooks Buckley & Bean
ATTORNEYS

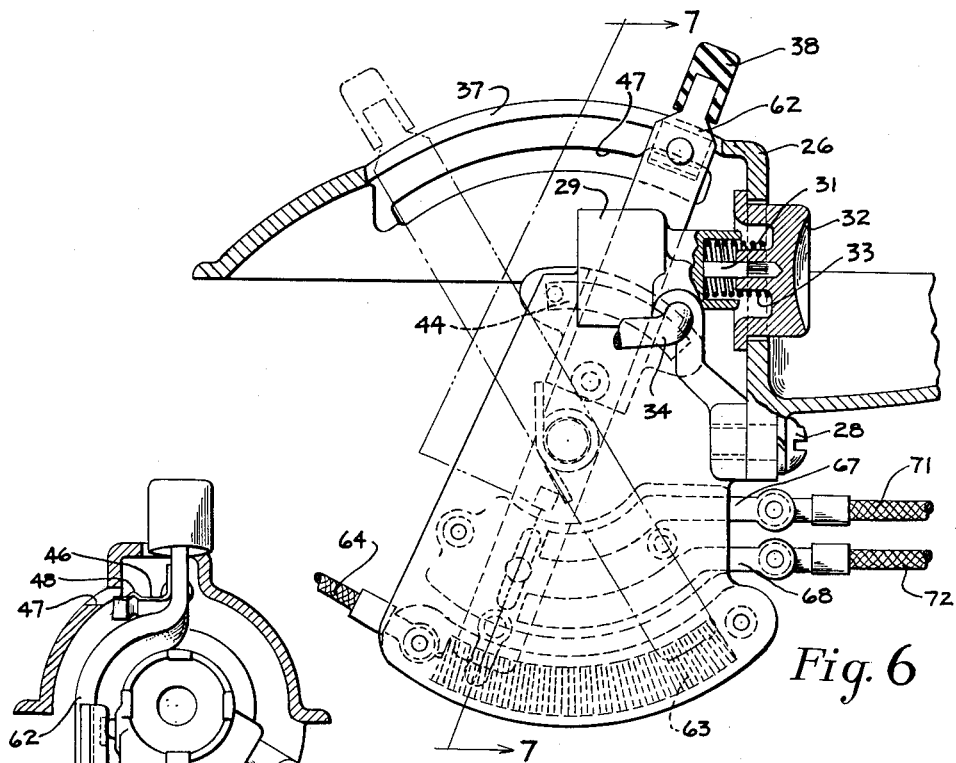
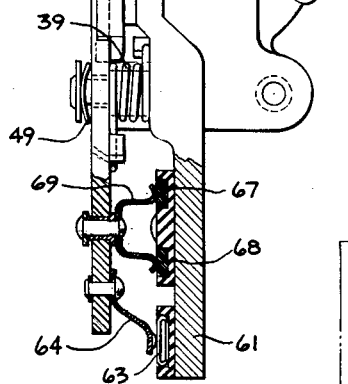
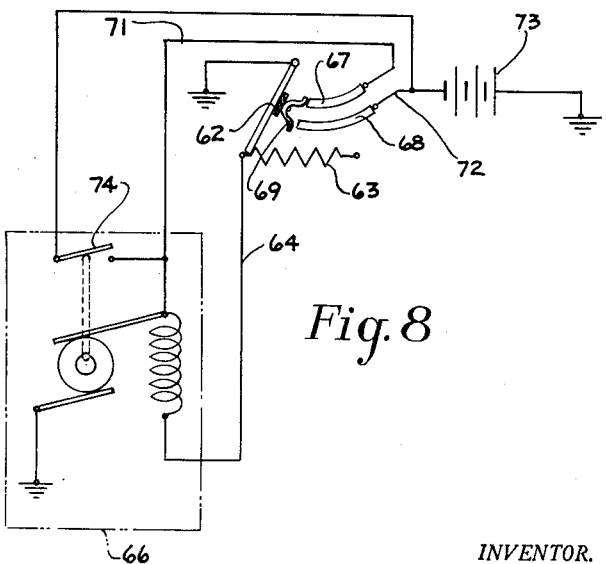
Fig. 6
Fig. 7
Fig. 8
INVENTOR.
Bronislaus S. Graczyk and
William C. Riester
BY
Bean Brooks Buckley & Bean
ATTORNEYS

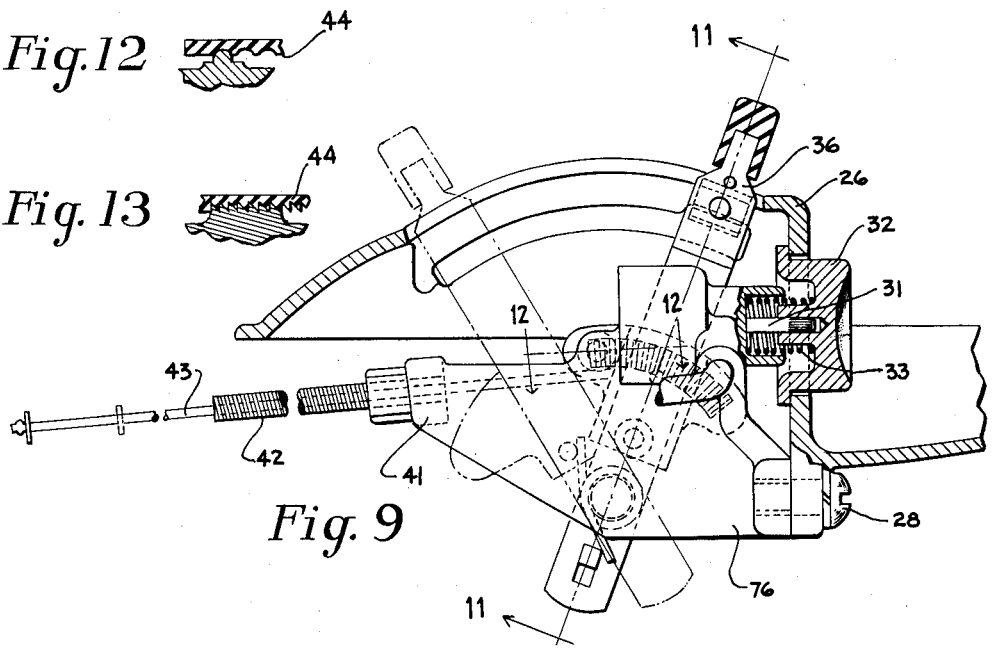
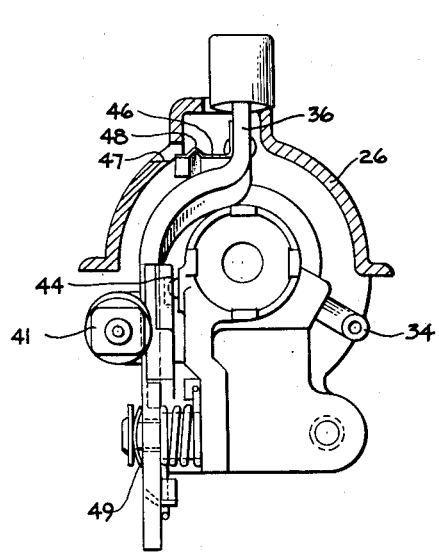
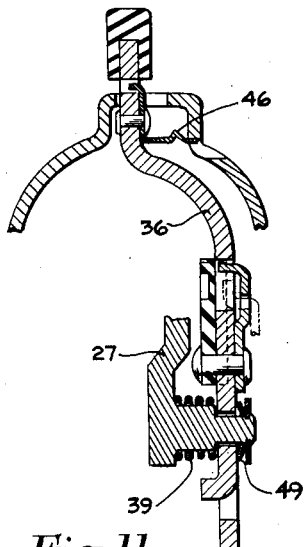

United States Patent Office 2,990,530
Patented June 27, 1961

2,990,530
WINDSHIELD CLEANER CONTROL
Bronislaus S. Graczyk, Snyder, and William C. Riester, Buffalo, N.Y., assignors to Trico Products Corporation, Buffalo, N.Y.
Filed July 5, 1956, Ser. No. 595,959
9 Claims. (Cl. 338—67)

This invention relates to windshield cleaners and more particularly to a windshield cleaner control.

In the modern motor vehicles, the trend has been toward the utilization of accessories and other means contributing to the safe and more convenient operation of the vehicle. For example, such features as power steering, remote control power operated windows, and windshield washers, have become more or less standard equipment on the present day motor vehicles. The present invention is concerned with the problem of providing an operative control for the windshield wipers and a coordinated windshield washer assembly and provides a solution whereby the operative control of said units is achieved in a convenient and reliable manner thus contributing to safer and easier motor vehicle operation. More particularly, the invention comprises a control unit including a lever means which may be selectively positioned to control wiper motor speed, and also includes a button which can be depressed to initiate a windshield washing and wiping cycle. The control unit is adaptable for use on motor vehicles employing either fluid pressure operated wiper motors i.e., sub-atmospheric or super-atmospheric pressures, or an electrically powered wiper motor, and may be positioned within easy reach of the vehicle operator, such as on the side curved portion of the instrument panel as currently found in vehicles having the panoramic type windshield. The control unit of the invention features means whereby the lever means will automatically move from any set operative position to off-position in response to a simple manipulation on the part of the vehicle operator.

The main object of this invention is to provide a windshield wiper and washer control that may be conveniently located and operated whereby the safety and ease of operation of the vehicle is enhanced.

A further object of the invention is to provide a control unit which may be conveniently used to selectively control wiper motor operating speeds, and in which an automatic return to off-position may be achieved by a simple manipulation of the control.

Another object of the invention is to provide a control means affording either individual control of the wiper motor, or a coordinated control of a windshield washer and wiper system.

These and further objects and features of the invention will become more apparent from the following description and the accompanying drawings wherein;

FIG. 1 is a fragmentary perspective view illustrating a control unit embodying the principles of the invention as applied to a motor vehicle;

FIG. 2 is a view partly in section of the control unit of FIG. 1;

FIG. 3 is a view as seen from line 3—3 in FIG. 2;

FIG. 4 is a partial section view as seen from line 4—4 in FIG. 2;

FIG. 5 is a perspective view of a valve element used in the control of FIG. 2;

FIG. 6 is a control assembly embodying the principles of the invention as arranged for use with an electrically powered wiper motor;

FIG. 7 is a section view generally as seen from line 7—7 in FIG. 6;

FIG. 8 is a diagrammatic illustration of an electric circuit for controlling an electrically powered wiper motor when using the control unit of FIG. 6;

FIG. 9 is a modified form of control unit embodying the principles of the invention;

FIG. 10 is an end view of the control unit of FIG. 9;

FIG. 11 is a partial section view generally as seen from from line 11—11 in FIG. 9;

FIG. 12 is a partial section view as seen from line 12—12 in FIG. 9, illustrating a ratchet tooth arrangement; and FIG. 13 is a section view similar to FIG. 12 but illustrating a modified form of ratchet tooth arrangement.

Referring now to the drawings and more particularly to FIG. 1; numeral 16 identifies a motor vehicle having a panoramic type windshield 17 on which is arranged a pair of wiper arms 18 for oscillatory movement as provided by a vacuum operated wiper motor 19 connected to the wiper arms by flexible transmission means such as cables 21, all in the usual manner. A windshield washer assembly 22 including a pumping mechanism 23 is arranged for delivery of a supply of cleaning liquid to the windshield when desired by the vehicle operator in a manner which is further described and illustrated in the copending patent application of Raymond A. Deibel and William C. Reister, Serial No. 530,970, filed August 29, 1955, now Patent No. 2,877,486. The wiper motor 19 may further incorporate a high speed control as is more fully described in the copending patent application of J. R. Oishei and Martin Bitzer, Serial No. 455,211, filed September 10, 1954, now Patent No. 2,811,735. While a detailed understanding of the mechanism of the washer assembly and wiper motor is not essential for an understanding of the invention, sufficient functional description of these units will be given hereinafter for a proper understanding of the manner in which the control unit of the invention operates.

The control unit of the invention is identified by numeral 24, which as seen in FIG. 1, is mounted on the curved portion of the instrument panel in close proximity to the steering wheel to afford convenient manipulation by the vehicle operator. The control unit includes an outer housing, or escutcheon 26, which is affixed to the instrument panel, and a center piece 27 which is removably affixed to the housing by fastening means such as screws 28. The center piece 27 has a cylinder portion 29 in which is arranged a piston means 31 adapted for movement by a button 32 which projects from the housing 26 and is held in position by a compression spring 33, as best seen in FIG. 2. The piston means 31 is arranged in inoperative, or seated, position to maintain vacuum in a hose connection 34, and to expose the hose connection to atmosphere when the piston means is unseated, or shifted upon application of axial pressure on the button 32.

A conduit 35 is attached to the hose connection 34, the other end of said conduit leading to a coordinator mechanism 40 mounted atop the windshield washer assembly 22, which coordinator mechanism is responsive to atmospheric pressure to initiate a complete washer and wiping-cycle as is more clearly set forth in copending patent application Serial No. 530,970.

A lever means 36 is pivotally affixed to the center piece 27, and has one end extending through a slot 37 formed in the housing 26, said end having a finger pad 38 affixed thereto, which pad may be formed of a rubber-like material to provide good gripping action. A torsion spring 39, one end of which is anchored to the center piece 27 and the other end of which is anchored to the lever means, is arranged to urge the lever means clockwise (as seen in FIG. 2) toward off, or non-operative position. The center piece includes a protuberance 41 adapted to secure one end of a sheathing 42 of a Bowden wire assembly; one end of a wire 43 of the Bowden wire assembly is affixed to the lever means 36, the other end of said wire being connected to the valve of the wiper motor 19. In such manner, rotary movement of the lever means 36 will result in the operative control of the wiper motor 19. The lever means 36 will remain in any position of rotary adjustment by virtue of a rack and tooth arrangement 44, the shape of the teeth thereof being formed as is illustrated in either FIG. 12 or 13.

The lever means 36 is arranged to be rocked laterally upon its pivotal connection to effect disengagement of the rack and tooth arrangement 44. To provide automatic return of the lever means to off-position upon lateral rocking thereof, a resilient arm 46, affixed at the upper end of the lever means, is adapted for movement through a slot 47 formed in the housing 26, said resilient arm having a shoulder 48 which will engage the outer corner of the slot 47 after movement of the arm 46 therethrough, whereby the rack and tooth arrangement will be maintained disengaged as the lever means 36 is shifted to off-position by action of the torsion spring 39. The slot 47 is enlarged at one end to provide clearance for the arm shoulder 48 so that the lever means 36 will be returned to normal position upon its pivot under the urge of a resilient cup washer 49. In such off-position of the lever means, the rack and tooth arrangement will again be engaged.

From the foregoing it will be seen that as the lever means 36 is rotated about its pivot, it will be automatically maintained in the position to which it was moved by virtue of the engagement of the rack and tooth arrangement 44, and that upon a slight lateral pressure upon the end of the lever means whereby the shoulder 48 of the arm 46 is moved to clear the outer edge of the slot 47, the lever means 36 will be automatically returned to off-position by action of the torsion spring 39, in which position the shoulder 48 of the resilient arm 46 will have clearance so that the lever means can be returned to normal position upon its pivoted connection. Thus the operator of the vehicle can achieve any setting of the wiper motor to provide the desired speed of wiper action, which setting will be maintained until a slight lateral pressure is inserted on the end of the lever means 36, which will result in the automatic return of the lever means to off-position to discontinue wiper motor operation.

The wiper motor 19, which is arranged to provide wide arc movement of the wiper arms 18 whereby the frontal and side areas of the panoramic type windshield are wiped, is further arranged to provide a short arc wiper movement wherein only the frontal areas of the windshield are wiped, such short arc wiping being at increased oscillating speed. As disclosed in detail in the copending patent application Serial No. 455,211, the change from long arc wiper motor operation to short arc wiper motor operation is accomplished by means including a piston responsive to vacuum to maintain a control linkage in on-position whereby long arc wiper motor operation is achieved, said piston being responsive to atmospheric pressure to shift the mechanism whereby short arc wiper motor operation is achieved. The control unit of the present invention is arranged to control said piston of the wiper motor. For such purpose, an arcuate slot 51 is arranged in the center piece in the region of the inner end of the lever means 36. Within the slot 51 is slidably positioned a valve 52, preferably formed of a rubber-like material, which valve is shiftable by means of a finger 53 formed on the end of the lever means 36. A compression spring 54, arranged between the lever means 36 and the valve 52, maintains the latter within the slot 51. A pair of hose connections 56 and 57 are arranged in the mid-portion of the slot 51 and open thereinto as best seen in FIG. 3. Hose connection 57 is adapted to receive a conduit 58 which is connected to a source of vacuum, while hose connection 56 is adapted to receive a conduit 59 which is connected to the wiper arc control piston of the wiper motor 19. The valve 52 is arranged to bridge the hose connections 56, 57 through- out practically the full rotary movement of the lever means 36. However, when the lever means 36 is moved to its maximum on-position, it will be seen that the valve 52 will no longer bridge hose connections 56 and 57, hose connection 56 instead being open to atmosphere. When this occurs, the wiper arc control piston of the motor 19 will be shifted under atmospheric pressure to cause short arc, and higher speed wiper movement, which action will continue until the operator causes the lever means 36 to be rotated toward, or into off-position, which movement will simultaneously bridge the hose connections 56 and 57, and restore the wiper motor to long arc operation.

It will be further seen that by simply depressing the button 32 to unseat the piston means 31 to allow air at atmospheric pressure to flow in the conduit 35 to the coordinating mechanism 40, a complete washer and wiping cycle may be effected. Obviously, if the wiper motor had been operating under some particular setting of the lever means 36 when the button 32 was depressed to cause a coordinated washer and wiping cycle, the wiper motor would continue to operate in accordance with the setting of the lever means 36 after completion of the washer-wiper cycle.

Referring to FIGS. 6 and 7, a modified embodiment of the control unit of the invention is shown, said modified embodiment being arranged for use with an electrically powered wiper motor. For the sake of simplicity, parts similar to that described with respect to the embodiment shown in FIGS. 2 through 5, will be given the same numerical identification. The modified control unit includes an outer housing 26 affixed to the instrument panel, and a center piece 61 which is removably affixed to the housing by fastening means such as screws 28. The center piece 61 has a cylinder portion 29 including piston means 31 adapted for movement by button 32 which projects from the housing 26 and is held in position by the compression spring 33. The piston means 31 is adapted to maintain vacuum in the hose connection 34, and to expose the hose connection to atmosphere when the piston means is unseated, or shifted upon application of axial pressure on the button 32. A lever means 62 is pivotally affixed to the center piece 61, and has one end extending through the slot 37 formed in the housing 26, said end having the finger pad 38 thereon. A torsion spring 39, one end of which is anchored to the center piece, the other end of which is anchored to the lever means, is arranged to urge the lever means clockwise (as is seen in FIG. 2) toward off, or non-operative position. On the lower end of the center piece is arranged a rheostat 63 which is slidably engaged by a resilient arm 64 affixed toward the lower end of the lever means 62. The rheostat has connected at one end a wire 64 the other end of said wire being connected to the field winding of an electrically powered wiper motor 66. A pair of contact bars 67, 68 are affixed to the center piece 61, said bars being arranged for sliding contact by a resilient clip member 69 which is secured to the lever means. The rheostat 63, as well as the contact bars 67, 68, are insulated from the center piece 61, while the clip member 69 is insulated from the lever means 62. Wires 71 and 72 are attached to the contact bars 67 and 68 respectively, wire 71 being joined to the field winding of the electrical wiper motor 66 at the opposite end thereof to which wire 64 is connected, while wire 72 is connected to a source of electrical energy, such as a battery 73. The control unit is grounded to the vehicle frame by reason of the fact that the housing 26 is mounted upon the instrument panel of the vehicle, thereby providing the necessary electrical circuit for operation of the wiper motor 66. A rack and tooth arrangement 44 between the lever means 62 and the center piece 61 maintains the lever means in any position of rotary adjustment. A resilient arm 46 is affixed to the lever means 62, said arm having a shoulder 48 for holding the lever means so that the rack and tooth arrangement may be disengaged and the lever means automatically returned to non-operative position under the influence of the torsion spring 49.

From the foregoing it will be seen that the lever means may be conveniently manipulated by the vehicle operator to any rotational position of adjustment whereby the rheostat will control the wiper motor speed and hence the rate of windshield wiping, and also that the lever arm will be automatically returned to off-position by a slight pressure against the end thereof to disengage the rack and tooth arrangement 44. It wil be further seen that in the off-position of the lever means, the clip member 69 will be out of engagement with contact bars 67, 68 thus cutting off electrical power from the motor. It may be mentioned that the wiper motor 66 includes a parking switch 74 arranged for motor parking, in the well known manner. In addition the button 32 may be depressed to initiate a complete washer-wiping cycle in the manner of the control unit heretofore described.

The control unit illustrated in FIGS. 9 to 11, for use with pressure operated wiper motors, i.e., sub-atmospheric or super-atmospheric pressures, does not include wiper arc regulating means such as the wiper motor 19 discussed heretofore. The only difference between the control unit of the FIG. 9 illustration as compared with that of the FIG. 2 illustration is that the former has a center piece 76 that does not have a slot arrangement for a sliding valve such as valve 52 shown in the FIG. 2 embodiment.

With regard to all three embodiments of the control unit disclosed herein, it will be seen that an easy conversion from one type to another may be made by simply replacing the center piece and attached lever means, thus making the control unit adaptable for use with different types of wiper motors. If, in addition, it is found desirable to eliminate the automatic return feature of the lever means, it is only necessary to eliminate the resilient arm 46, whereby return of the lever means to off-position will be under control of the vehicle operator.

The foregoing description has been made in detail without thought of limitation since the inventive principles involved are capable of assuming other physcial embodiments without departing from the spirit of the invention and scope of the appended claims.

What is claimed is:

1. A control unit for a windshield wiper motor comprising a housing means, a center piece removably affixed to the housing means, a lever means pivotally affixed to the center piece and having one end projecting beyond the housing means, said lever means adapted for operative connection with motor speed control means, a rack and tooth arrangement between the lever means and the center piece to maintain the lever means in any position of rotary adjustment, and a torsion spring arranged between the lever means and the center piece and adapted to exert a constant rotary force in one direction upon said lever means.

2. A control unit for a windshield wiper motor according to claim 1, wherein a second speed control means in the form of a valve means is operatively connected to the inner end of said lever means, said valve means being adapted to bridge a pair of hose connections operatively connected to the other of such speed control means and affixed to the center piece, said valve means being further adapted to expose one of said hose connections to atmosphere when the lever means is rotated to an extreme position, and said torsion spring being arranged between the lever means and the center piece adapted to exert a constant rotary force in one direction upon said lever means.

3. A control unit for a windshield wiper motor comprising a housing means, a center piece removably affixed to the housing means, a lever means pivotally affixed to the center piece and having one end projecting beyond the housing means, said lever means being adapted for operative connection with motor speed control means, a rack and tooth arrangement between the lever means and the center piece to maintain the lever means in any position of rotary adjustment, a torsion spring arranged between the lever means and the center piece and adapted to exert a constant rotary force in one direction upon said lever means, and means arranged to maintain the rack and tooth arrangement disengaged whereby said torsion spring will rotate the lever means toward one extreme rotary position of adjustment.

4. A control unit for a windshield wiper motor comprising a housing means, a center piece removably affixed to the housing means, a lever means pivotally affixed to the center piece and having one end projecting beyond the housing means, said lever means being adapted for operative connection with motor speed control means, a rack and tooth arrangement betwen the lever means and the center piece to maintain the lever means in any position of rotary adjustment, a torsion spring arranged between the lever means and the center piece adapted to exert a constant rotary force in one direction upon said lever means, and an arm means affixed to the lever means, said lever means being arranged for lateral movement upon its pivotal connection for disengaging the rack and tooth arrangement, and said arm means being adapted upon said disengaging movement to maintain the lever means in laterally adjusted position whereby the torsion spring can rotate the lever means to an extreme rotary position of adjustment, the arm means then permitting reengagement of the rack and tooth arrangement.

5. A control unit for an electrical windshield wiper motor comprising a housing means, a center piece removably affixed to the housing means, a lever means pivotally affixed to the center piece and having an outer end projecting beyond the housing means, a rack and tooth arrangement between the lever means and the center piece to maintain the lever means in any position of rotary adjustment, a rheostat arranged on the inner end of the lever means and adapated for providing increased resistance in an electrical field winding of an electric wiper motor as the lever means is rotated, and a switch means for closing an electrical circuit of a wiper motor upon rotation of said lever means.

6. A control unit for an electrical windshield wiper motor comprising a housing means, a center piece removably affixed to the housing means, a lever means pivotally affixed to the center piece and having an outer end projecting beyond the housing means, a rack and tooth arrangement between the lever means and the center piece to maintain the lever means in any position of rotary adjustment, a torsion spring arranged between the lever means and the center piece and adapted to exert a constant rotary force in one direction upon said lever means, a rheostat arranged on the inner end of the lever means and adapted for providing increased resistance in the electrical field winding of an electric wiper motor as the lever means is rotated, and a switch means for closing an electrical circuit of the wiper motor upon rotation of said lever means.

7. A control unit for an electrical windshield wiper motor comprising a housing means, a center piece removably affixed to the housing means, a lever means pivotally affixed to the center piece and having an outer end projecting beyond the housing means, a rack and tooth arrangement between the lever means and the center piece to maintain the lever means in any position of rotary adjustment, a torsion spring arranged between the lever means and the center piece and adapted to exert a constant rotary force in one direction upon said lever means, means selectively operable to maintain the rack and tooth arrangement disengaged whereby said torsion spring will rotate the lever means toward one extreme rotary position of adjustment, a rheostat arranged on the inner end of the lever means and adapted for providing increased resistance in an electrical field winding of the electric wiper motor as the lever means is rotated, and a switch means for closing an electrical circuit of the wiper motor upon rotation of said lever means.

8. In a motor vehicle having a windshield wiper motor, a control unit for the wiper motor, said control unit being mounted for convenient use by the vehicle operator and including a supporting structure, a stud projecting from the supporting structure, a lever member, means mounting said lever member on the stud for movement thereabout from an off position to an on position for selectively controlling said wiper motor operation speed, said mounting means permitting rockable lateral movement of said lever in the direction of the axis of said stud, inter-engaging means having parts mounted on said lever and said supporting structure normally holding said operating lever in an on position, said holding means being released upon rockable lateral movement of said lever by said operator, and spring means for returning said operator lever to an off position upon release of said holding means.

9. In a motor vehicle having a windshield wiper motor, a control unit for the wiper motor, said control unit being mounted for convenient use by the vehicle operator and including a supporting structure, a stud projecting from the supporting structure, a lever member, means mounting said lever member on the stud for movement thereabout from an off position to an on position for selectively controlling said wiper motor operation speed, said mounting means permitting rockable lateral movement of said lever in the direction of the axis of said stud, inter-engaging means having parts mounted on said lever and said supporting structure normally holding said operating lever in an on position, said holding means being released upon rockable lateral movement of said lever by said operator, spring means for returning said operating lever to an off position upon release of said holding means, and means holding said lever inter-engaging means disengaged to permit full movement of said lever to off position after disengagement by said rockable lateral movement.

References Cited in the file of this patent

UNITED STATES PATENTS

| | | |
|---|---|---|
| 713,838 | Bates | Nov. 18, 1902 |
| 733,758 | Spinney | July 14, 1903 |
| 1,277,297 | Davis | Aug. 27, 1918 |
| 1,343,951 | Whyte | June 22, 1920 |
| 1,743,949 | Wortham | Jan. 14, 1930 |
| 1,902,700 | Hadano | Mar. 21, 1933 |
| 2,320,837 | Turner et al. | June 1, 1943 |
| 2,329,949 | Sharpiro | Sept. 21, 1943 |
| 2,732,523 | Schnepf | Jan. 24, 1956 |